Sheed & Carpenter.
Thrashing Mach.
Patented May 9, 1835.
8818X
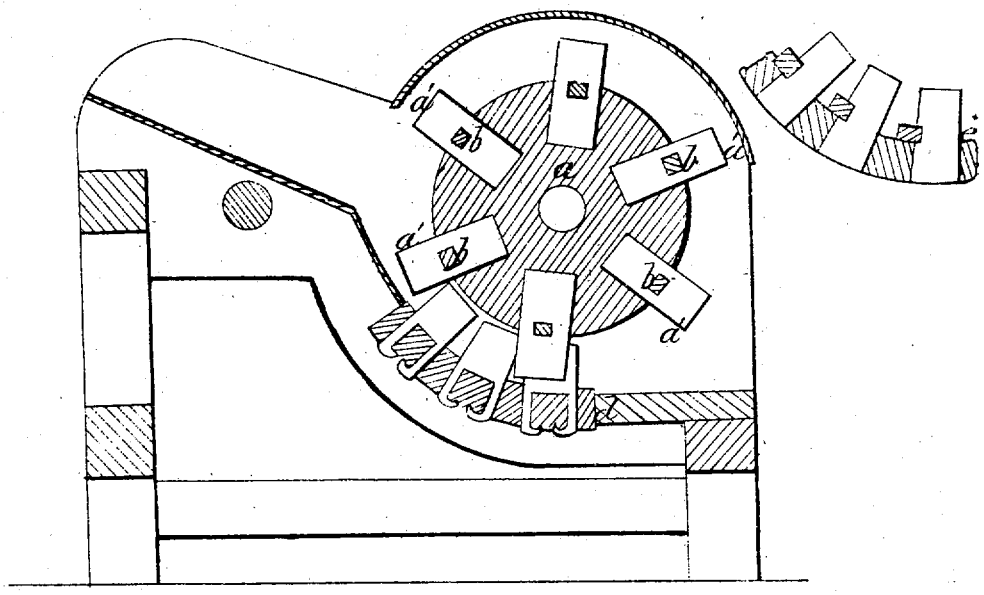
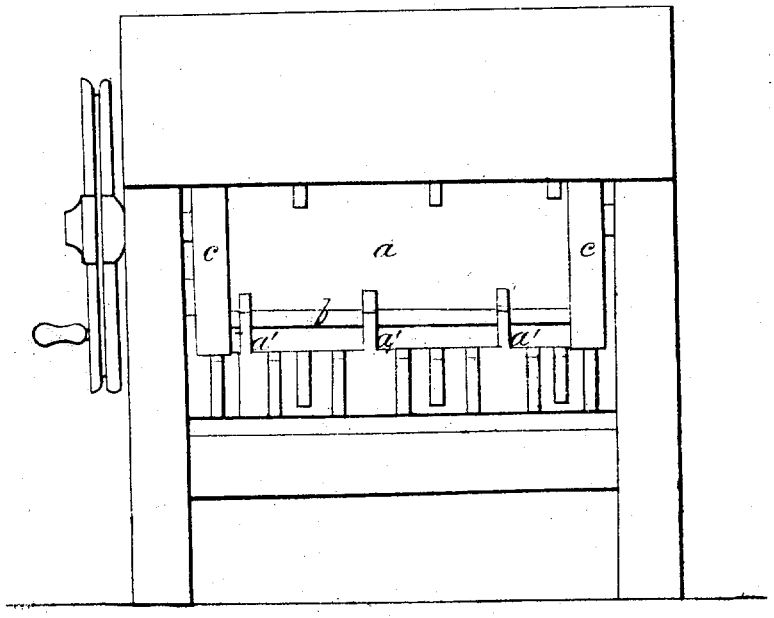

8818X May 9, 1835 1/2

Stapleton C. Sneed & William B. Carpenter;
of the County of Albermarle and State of Virginia.

Letters Patent.

The Schedule referred to in these Letters Patent and making part of the same, containing a description in the words of the said Stapleton C. Sneed and William B. Carpenter themselves of their improvement in Archibald Douglas' spike thrashing machine.

To all to whom these presents shall come:
Be it known that we Stapleton C. Sneed and William B. Carpenter of the County of Albemarle and State of Virginia, have invented a new and useful improvement in Archibald Douglas Spike wheel threshing machine and the following is a full and exact description of the construction and operation of the said machine as invented or improved by us. The spikes used by us are 1½ inches by ½ inch 6 inches long. drove into the cylinder 4 inches projecting 2 inches, there is a mortis through each spike through which passes a bair of iron 3/4 by 3/8 that bair let in a groove each length ways in the cylinder the top edge ranging with the surface of the cylinder the bands on each end of the cylinder, confineing each end of the bairs that pases through each spike, the whole cylinder covered with sheet iron.
There is two other planes of securing the spikes which we clame in our pattent, one for the concave, say a double shanke drawn on each edge of the spike, they drove through and clinched on the opposite side, the other with a notch foged in the back of the spike, the bair resting in the notch instead of pasing through the spikes; our model will explane wy point more perfect and all the different shaped spikes. This machine can be used to thresh down or up as may be prefered.
Witnesses William Bell
John W. Chewning Stapleton C. Sneed
William B. Carpenter 317 model]

Drawing [illegible]